Sept. 1, 1936.   R. J. McKAY ET AL   2,053,096
CLADDED COOKING UTENSIL
Filed Jan. 11, 1935

| LEGEND | |
|---|---|
| POINTS | TEMP. °F AT |
| O | OVER FLAME |
| + | 4" FROM FLAME AT BOTTOM |
| • | 8" FROM FLAME AT WALL |

INVENTORS
ROBERT J. McKAY
BY EDMUND M. WISE.
Byrne, Stebbins & Blenko
ATTORNEYS

Patented Sept. 1, 1936

2,053,096

UNITED STATES PATENT OFFICE 2,053,096

CLADDED COOKING UTENSIL

Robert J. McKay, Basking Ridge, and Edmund M. Wise, Westfield, N. J., assignors to The International Nickel Company, Inc., New York, N. Y., a corporation of Delaware Application January 11, 1935, Serial No. 1,286

4 Claims. (Cl. 53—1)

The present invention relates to utensils having high lateral heat conductivity and high corrosion resistance and to composite ductile metal products integrally united having not only high heat conductivity but also high corrosion resistance.

Heretofore, various attempts have been made to produce a material suitable for the manufacture of articles such as cooking utensils, containers, chemical apparatus and other equipment which require strength, corrosion resistance and heat conductivity.

Some of the prior materials which have been used, for instance, for household cooking utensils were aluminium, enameled steel, tinned steel, stainless steel, nickel-chromium alloys, copper, copper alloys, tinned copper, cast iron, etc. The use of these metallic products, however, involved certain disadvantages and produced utensils having certain shortcomings and defects. One of the main disadvantages was that the utensils lacked the combination of the essential and required properties and possessed only limited properties and lacked other important qualities and features. Thus, some of the utensils presented the disadvantages that they were subjected to the corrosive action of the food products and that with use became roughened, resulting in the contamination of the food and in the sticking of the food to the roughened surface. Other utensils had poor heat diffusing properties, due primarily to the low heat conductivity of the material used, which resulted in local overheating and in a pronounced tendency to burn the food in localized areas or zones when any rapid heating was attempted or when food stuffs containing solid particles were being cooked. Furthermore, certain prior utensils were not permanent or durable under shock and/or wear, or showed other physical chemical or metallurgical weaknesses causing a short life. Thus, some were easily scratched or dented in use, while others although resistant to denting were excessively difficult to form owing to the hardness of the solid metal employed.

Attempts have been made to make cooking utensils of various other materials, metals, and metal combinations, but, as far as we are aware, none were wholly successful and completely satisfactory in service and none possessed the special combination of essential properties.

We have discovered a utensil made of a unique composite metallic product which is free from the disadvantages and shortcomings noted hereinabove, and which is capable of giving satisfactory, successfully and commercially acceptable service in actual and practical use.

It is an object of the present invention to provide a utensil possessing not only excellent corrosion resistance but also high heat conductivity, particularly in a direction parallel to the plane of the sheet.

It is another object of the present invention to provide a utensil made from a composite sheet which has a base metal or alloy of high heat conductivity and a corrosion resistant or stainless cladding metal or alloy firmly and integrally bonded to one or both surfaces of the base material, which is strong, ductile, sufficiently hard and which can be fabricated into various forms and shapes easily and economically.

It is a further object of the invention to provide utensils, containers and other articles having a high heat conductivity and stainless and/or heat resisting properties coupled with easy fabrication, durability and high resistance to scratching and denting.

It is also within the contemplation of the invention to provide cooking utensils which are free from attack by food, which are able to transmit heat uniformly across substantially the entire heating area at a high rate without burning, which are easy to clean and which are durable under wear and shock, light, attractive and easy to manufacture.

Other objects and advantages of the invention will become apparent from the following description taken in conjunction with the accompanying drawing in which.

Figure 3:
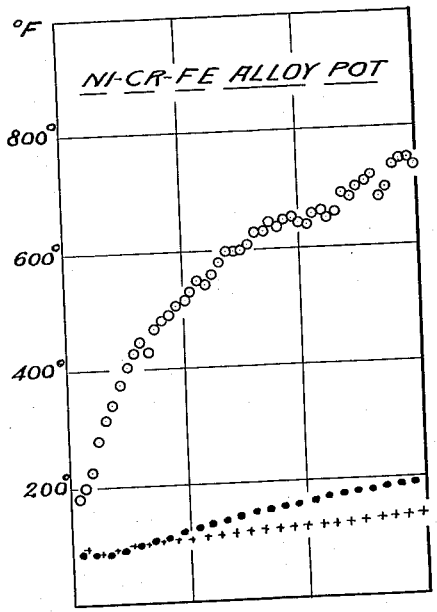
Fig. 3 is a graph showing similar data taken in a vessel made of solid nickel alloy.
Figure 4:
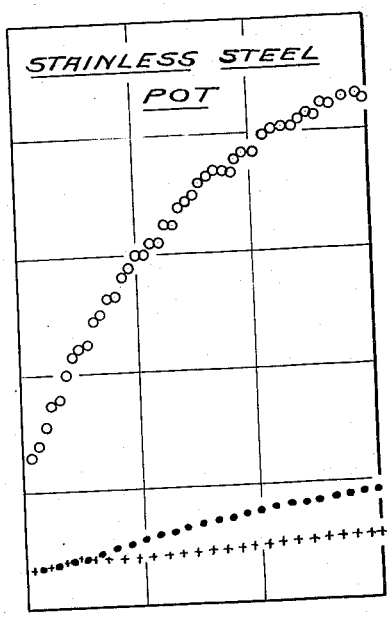
Fig. 4 indicates the results of a similar experiment on a vessel made entirely of stainless steel.
Figure 1:
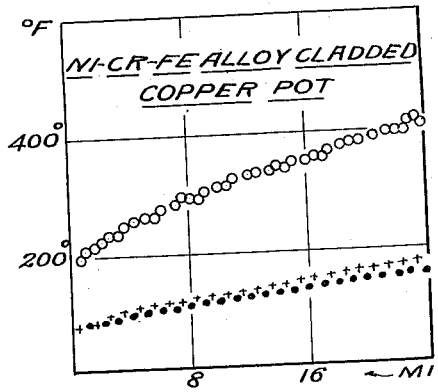
Fig. 1 shows a graph indicating the change in temperature with time at various points of a vessel embodying the present invention.
Figure 2:
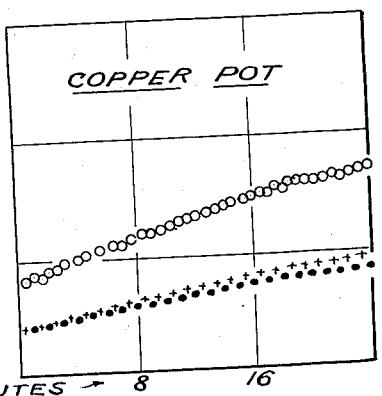
Fig. 2 illustrates the same relationship in a vessel made of solid copper.

Generally speaking, the present discovery contemplates the provision of a utensil constituted of a cladded metal product comprising a base metal of high heat conductivity, such as copper or a copper alloy, and a cladding metal of high corrosion resistant properties, such as chromium containing nickel alloy, stainless steel etc. firmly and integrally bonded to one or both surfaces of the base metal. The composite metal is ductile and it can be readily drawn, rolled, pressed and otherwise worked and fabricated into various forms and shapes and requires no special processing steps other than polishing after being pressed or spun into shape. It is to be noted that the composite metal possesses a special combination of features including strength, corrosion resistance, high heat conductivity and ductility. In addition, the composite metal has other properties which make it particularly suitable for articles, such as cooking utensils, kettles, autoclaves, chemical equipment, etc.

In carrying the invention into practice, the composite metal may be manufactured by any suitable process in which the bonding of the base metal or alloy to the cladding or coating metal or alloy is so effective, reliable and complete that the product can be stressed and deformed severely without rupturing the bond between the base and the coating. Satisfactory results have been obtained by casting molten copper against properly fluxed chromium containing alloy sheets to produce composite slabs of convenient dimensions. In another process, the cladding metal is first adherently coated with a film of copper, iron, nickel, or a nickel or copper containing alloy, and then a base metal or alloy having a clean surface is contacted firmly against the film of copper or nickel or alloy. The base metal and the cladding metal are then secured together in some appropriate manner, such as by clamping, weighting, welding, soldering, or the like, and the composite metal is then heated to a relatively high temperature, preferably in a reducing atmosphere. If a stack of plates are piled on each other, the weight thereof may be sufficient to cause interdiffusion of the copper or nickel or similar film into not only the base metal but also the cladding sheets or plates, especially during the subsequent hot working operations, thereby, forming a bond possessing high physical properties and an integral product. In some cases, a heavy weight may be placed on the sheets to promote the bonding of the sheets, or hot working, such as rolling, forging or the like may be employed. After the bonding of the various layers has been accomplished, the composite sheets may be subjected not only to hot working, but also to cold working and to annealing operations. Strips of a composite sheet, which were made by the aforementioned process, have been subjected to severe stresses and deformation without rupturing the bond between the base and the coating, thus indicating that the product is particularly valuable where it is to be used in structures, which are subjected to severe stresses, or where it is to undergo severe fabricating operations.

For the purpose of giving those skilled in the art a better understanding of the invention, the following specific example is given for the purpose of illustration.

A plate of copper may be cladded with a nickel alloy containing approximately 14% chromium and 6% iron by any suitable method, forming a composite slab about 1″ to 2″ thick and of any convenient dimension, say 12″ x 24″. It is preferred to have the thickness of the single nickel alloy layer between about $\frac{1}{20}$ to $\frac{1}{4}$ of the thickness of copper plate, or in all about 5% to about 30% of the total thickness of the composite plate. The copper may have an equal thickness of the nickel alloy on both surfaces, or the nickel alloy may be heavier on one side, or it may be only on one side of the copper plate. The composite slab may then be cold worked with or without intermediate anneals to any desired gauge, depending on the use to which the material is to be adapted. For instance, if the material is to be used for the usual light type of household cooking utensils, the composite slab may be rolled to about 0.021″–0.025″ total thickness. For household frying pans and the lighter forms of hotel utensils, it is preferable to roll the metal to a gauge of about 0.050″ thickness. For heavier hotel utensils, gauges in the neighborhood of about 0.125″ may be used. The sheets may, of course, be rolled to any desired thickness, the limit depending on the particular mill which is rolling them, and sheets $\frac{1}{4}$″–$\frac{1}{2}$″ thick may be made, if desired for any particular purpose. Utensils may then be drawn and manufactured from the finished sheet in much the same way as is done with a solid metal.

In the case of sheet bearing the corrosion resistant chorium-nickel alloy on one side only, utensils may be drawn with the corrosion resistant side on the interior. In certain instances, it may be desirable to have the corrosion resistant cladding on the outer surface of the vessel only. The copper surface forming the other surface of the vessel may then be finished by polishing or by plating with other metals, or other type of finishes may be applied.

It is to be noted that in manufacturing processes the ductility and softness of the copper base is transmitted to the whole composite material, so that the composite product responds to deformation, rolling, drawing and similar treatments, in much the same way as does copper itself. Moreover, the bonded layer, or layers of the nickel alloy effectively supplement the strength of the base metal and enable the composite metal to be more highly stressed in tension, compression, shear and particularly in bending than would be safe with a plate or sheet of solid copper. Furthermore, the manufacturing process and the formation of utensils of any desired shape, substantially free from wrinkles or inequalities of any sort, may thus be carried out more economically and more easily than with a solid metal which has high hardness and strength such as stainless steel.

It is to be observed that the composite metal combines the strength, hardness and corrosion properties of the surface alloy with the high heat conductivity and excellent thermal properties of the copper base.

Those skilled in the art are familiar with the physical properties of the copper itself, and of the chromium containing nickel alloy. As it is well known, the composition of the cladding alloy may be approximately 80% nickel, 12%–14% chromium, and 5%–6% iron, which presents the most favorable condition of corrosion resistance, strength and working properties.

The following schedule sets forth for convenience and by way of example the properties of a nickel alloy having the above mentioned composition, of copper and of composite metal sheet containing 80% copper as base and a 10% layer of the nickel alloy on each side.

Schedule

| Properties | Nickel-chromium alloy | Copper | Present product composite |
|---|---|---|---|
| Annealed sheet and strip: | | | |
| Tensile strength (annealed) | 80-95,000 lb./sq. in | 32,000 | 45-50,000. |
| Yield point | 30-40,000 lb./sq. in | 10,000 or less | 12-18,000 (approx.). |
| Percent elongation | 45-55% | 40%-60% | 40%-50%. |
| Reduction of area_____percent | 65-75% | 72% | 50%-60%. |
| Brinell hardness | 128-142 | 48 | 142 or higher. |
| Density | 8.55 | 8.9 | 8.8. |
| Coefficient of expansion 100°-200° F. per °F. | 0.0000064 | 0.0000093 | 0.0000083. |
| Heat conductivity at 100° C | 4.2% of copper 0.1 watts/cm./deg. C. | 100% | Parallel to face, 81% of copper perpendicular to face, 18% of copper. |
| Specific heat cal./gm./deg. C | 0.109 | 0.0919 | 0.094. |
| Melting point (Solidus) | 2530° F | 1981° F | 1981° F. |
| Modulus of elasticity in tension | 32,000,000 | 16,000,000 | 19,200,000. |
| Corrosion resistance: | | | |
| (1) Salt water | 8-10 m. d. d | 22-28 m. d. d | 8-10 m. d. d. |
| (2) Vegetables | No tarnish | Tarnish | No tarnish. |
| (3) Sour milk | No attack | Heavy attack | No attack. |
| (4) Nitric acid | Passive | Violent solution | Passive. |
| (5) Damp air | No effect | Tarnish | No effect. |

It is to be observed that while usefully low yield points and high reduction of area are obtained by annealing, strength up to 200,000 pounds per square inch may be obtained by cold working the nickel alloy, and that the alloy shows full corrosion resistance and freedom from aging or corrosion embrittlement in both cold worked and annealed state. The high modulus of elasticity indicates exceptional rigidity. Furthermore, the high annealing temperature of the corrosion resisting nickel alloy permits of the retention under service condition of the high strength acquired by cold working throughout the life of the equipment. This is not the case with copper which is annealed and softens at a relatively low temperature.

The excellent corrosion resistance properties of the cladding nickel alloy has been established by a large number of data based on practical experience and on comparative tests. The rather large amount of chromium in the alloy adds freedom from staining and tarnishing to the well known high resistance of nickel to acid, alkalies, salt, atmospheric corrosion, etc. This freedom from tarnishing and staining is a highly desirable feature in food handling, as it prevents "dirty equipment", and makes cleaning a much easier procedure.

It is to be noted from the construction of the composite sheet that, while the high physical properties of the nickel alloy are imparted to the sheet to an amount proportional to the percent of the alloy in the sheet, the corrosion properties of the sheet are practically those of the corrosion resistant nickel alloy itself. Due to the high physical properties of the nickel alloy, even thin coatings thereof impart a very marked resistance to bending and denting to the composite alloy.

The heat conductivity of the composite sheet is dependent upon the relative proportions of copper and corrosion resistant alloy embodied in the composite sheet and due to the unique properties of such composite material the thermal conductivity is several times as great in a direction parallel to the face of the sheet as compared to the conductivity perpendicular to the face of the sheet. This directional property is of vital importance in insuring proper heat diffusion, and thus preventing burning.

The conductivity of composite sheets, one with 10% of the corrosion resistant alloy and one with 20% of the corrosion resistant nickel alloy united to a core of copper, are set forth below. The values for the conductivities will be unchanged if the relative amounts of the nickel alloy on the two sides is changed as long as the sum total of the nickel alloy remains constant.

| | Thermal conductivity relative to copper (Cu 100 percent) | |
|---|---|---|
| | Parallel to sheet | Perpendicular to plane of sheet |
| Sheet A: 10 percent corrosion resistant alloy on each side—copper core | Percent 81 | Percent 18 |
| Sheet B: 20 percent corrosion resistant alloy on each side—copper core | 62 | 10 |
| On the same scale aluminum would have the values | 52 | 52 |
| Brass | 28 | 28 |
| Nickel | 17 | 17 |
| Carbon steel | 12.5 | 12.5 |
| Stainless steel | 4.2 | 4.2 |

Due to the directional properties of the composite material above noted and to the high thermal conductivity parallel to the plane of the sheet, the temperature distribution over the surface of actual cooking vessels has been found to be far more uniform than has hitherto been attainable in corrosion resisting vessels.

Referring to the drawing, the curves show experimental data obtained by heating vessels containing milk over a localized flame and determining at regular intervals of time the temperature of the metal surfaces at the bottom of the pot directly over the flame, at a point on the bottom 4″ from the heated area and at a point on the wall above the liquid level and 8″ from the heated area. In these experiments the thickness of the nickel alloy, stainless steel and nickel alloy clad copper (20% cladding) was substantially identical, whereas the plain copper pot was about 19% thicker. In view of this, the behavior of the Inconel clad pot is even more remarkable, for it will be noted that the temperature distribution of the Inconel clad pot is about equivalent to the copper pot and far superior to the two solid corrosion resisting pots.

It was observed in these tests that the milk was scorched and unfit for use after heating in the two solid corrosion resistant pots but was perfectly satisfactory and useable after heating for 30 minutes in the nickel alloy clad pot.

Other tests have been made comparing the behavior of clad vessels of the present invention and vessels made of solid metal. In one instance it was found that after boiling 400 cc. of milk for five minutes over a Bunsen burner with gas flowing at the rate of 0.1 cu. ft. per minute, a stainless steel saucepan showed a quite badly burned ring in the center of the pan, while a composite sheet pan, which was 50% nickel alloy and 50% copper, showed only a light burning. It is to be noted that in this case the ratio of the nickel alloy cladding to copper is higher than would normally be employed.

Tests in utensils boiling white sauce produced bad burning on stainless utensils in three minutes, whereas with utensils made of composite sheet no burning occurred.

Utensils may be drawn and manufactured from the rolled composite sheet with the same amount of nickel alloy on both sides, or with a thinner layer on the outside and a thicker layer on the inside. They can also be made with the alloy on one side only and the copper on the other side may be finished simply by polishing, or by plating or the like.

Due to the stainless properties of the surface alloy, which retains its original gloss even after severe service conditions, the utensils are free from attack by food or roughening of the inside surface. Sticking of the food to the inside surface cannot occur and the vessels are easy to clean. Actual tests have shown that after burning foods by prolonged heating to dryness until they are completely carbonized, the charred remains will drop off by themselves or are easily removed by the slightest abrasion.

The natural stainless properties of the surface alloy preventing sticking of the food, is further enhanced by the high heat conductivity of the composite sheet and by the fact that the copper transfers the heat evenly to the alloy layer. This prevents local over-heating, and enables cooking to be carried out at a higher speed than it has been possible in utensils made from other materials without burning or charring of the food.

Due to the high physical properties and high heat conductivity of the composite strip, the utensils can be made of such light gauge 0.025"–0.050", as to be quite satisfactory from a weight standpoint. The high strength of the alloy surface layers gives the utensils an unusual durability and resistance to bending, denting and to shock. The hardness and strength of the surface layer and the uniformity of its properties, cause it to resist wear and abrasion by cleaners or other agents. The surface alloy of the composite sheet, moreover, is adapted to the production of utensils of attractive appearance, since it will take and retain any desired type of finish.

It is to be seen that the invention provides a utensil made of a composite material possessing a unique combination of physical properties which make it admirably suitable for articles requiring strength, surface hardness, corrosion resistance and high heat conductivity. The composite material is ductile and has a surface stability which distinguishes it from other coated materials obtained by electroplating, dipping, spraying, or other commonly used coating methods. Thus, the composite material can be cold worked and annealed, can be subjected to rolling, spinning, drawing, pressing, hammering, and the like, and can be easily and economically manufactured and formed into utensils of any desired shape or form.

Utensils made of the composite sheet herein described have a combination of properties which are not obtainable by the use of any other material, or combination of materials. Thus the cooking utensils are characterized by freedom from attack by food, ability to transmit heat at high rate without burning, ease of cleaning, durability under wear and/or shock, lightness, attractive appearance, ease of manufacture, etc.

Although the invention has been described in conjunction with preferred embodiments, it is observed that modifications and variation may be resorted to as one skilled in the art will readily understand. Thus, other metals or alloys having a sufficiently high thermal conductivity may be substituted for copper as the base of the composite sheet. Similarly, any other corrosion resistance metal or alloy, such as stainless steels, other nickel alloys, cobalt alloys, chromium alloys and the like may be employed as surface material to produce composite products having the aforementioned combination of properties and being capable of being worked into various articles and utensils.

Moreover, other articles of manufacture which can be produced from the composite product besides cooking utensils include autoclaves, kettles, dye vats, soap boiling equipment, dairy tanks, radio tube parts, etc., and other equipment for the chemical, dairy, food products, and allied fields and the home, which require strength, corrosion resistance and heat transfer.

We claim:

1. A light, strong, ductile cooking utensil having a smooth, polished, corrosion resistant surface and drawn from a light gauge continuous, non-separable, rolled sheet composed of a nickel chromium alloy firmly and integrally bonded to copper, said utensil having a high heat conductivity in a direction parallel to the plane of the sheet of at least 60% of that of copper and being capable of transmitting heat across substantially the entire area at a high rate without burning.

2. A light, strong, ductile cooking utensil having a smooth, polished, corrosion resistant surface and drawn from a light gauge, continuous, non-separable, rolled sheet having a thickness of about .020" to about .125" composed of a nickel chromium alloy constituting about 5 to about 30% of the total thickness of the sheet and firmly and integrally bonded to copper, said utensil having a high heat conductivity in a direction parallel to the plane of the sheet of at least 60% of that of copper and being capable of transmitting heat across substantially the entire area at a high rate without burning.

3. A light, strong, ductile cooking utensil having a smooth, polished, corrosion resistant surface and drawn from a light gauge, continuous, non-separable, rolled sheet having a thickness of about .020" to about .125" composed of a nickel chromium alloy containing about 72 to about 88% of nickel, about 10 to about 20% of chromium, and about 5 to about 60% of iron and firmly and integrally bonded to copper, said utensil having a high heat conductivity in a direction parallel to the plane of the sheet of about 60 to about 80% of that of copper and being capable of transmitting heat across substantially the entire area at a high rate without burning.

4. A high heat conducting, corrosion resisting, stainless, smooth and malleable non-separable sheet suitable for cold drawing and polishing into cooking utensils consisting of a copper base firmly and integrally bonded to a clad of nickel-chromium-iron alloy, said sheet having a high heat conductivity in a direction parallel to the plane thereof and being about 60% to about 80% that of copper.

ROBERT J. McKAY.
EDMUND M. WISE.